(12) United States Patent
Reynolds

(10) Patent No.: US 9,870,546 B1
(45) Date of Patent: Jan. 16, 2018

(54) SYSTEM AND METHOD FOR INDUSTRIAL PROJECT COST ESTIMATION RISK ANALYSIS

(71) Applicant: Turner Industries Group, L.L.C., Baton Rouge, LA (US)

(72) Inventor: Sean P. Reynolds, Ponchatoula, LA (US)

(73) Assignee: Turner Industries Group, L.L.C., Baton Rouge, LA (US)

( * ) Notice: Subject to any disclaimer, the term of this patent is extended or adjusted under 35 U.S.C. 154(b) by 441 days.

(21) Appl. No.: 14/493,451

(22) Filed: Sep. 23, 2014

Related U.S. Application Data

(60) Provisional application No. 61/881,301, filed on Sep. 23, 2013.

(51) Int. Cl.
*G06Q 10/00* (2012.01)
*G06Q 10/06* (2012.01)

(52) U.S. Cl.
CPC ................ *G06Q 10/0635* (2013.01)

(58) Field of Classification Search
CPC .... G06Q 10/0632; G06Q 10/00; G06Q 17/60; G06Q 40/06
USPC ....................................................... 705/7.28
See application file for complete search history.

(56) References Cited

U.S. PATENT DOCUMENTS

| | | | | |
|---|---|---|---|---|
| 6,675,127 B2 * | 1/2004 | LaBlanc | ............ | G06Q 10/0635 702/179 |
| 7,318,038 B2 * | 1/2008 | Labbi | ............... | G06Q 10/06313 705/7.23 |
| 7,318,039 B2 | 1/2008 | Yokota et al. | | |
| 7,752,020 B2 | 7/2010 | Seppanen et al. | | |
| 7,949,663 B1 | 5/2011 | Cassone et al. | | |
| 7,966,220 B2 | 6/2011 | Clark | | |
| 8,370,192 B2 | 2/2013 | Deo et al. | | |
| 8,458,009 B1 | 6/2013 | Southworth | | |
| 8,589,203 B1 * | 11/2013 | Collins | ................. | G06Q 10/00 705/7.12 |

(Continued)

OTHER PUBLICATIONS

Hanna, Mikhail, et al., "Simulation Tool for Manpower Forecast Loading and Resource Leveling", Published in Proceedings of the 2007 Winter Simulation Conference, Proceedings of the 39th conference on Winter simulation; pp. 2099-2103; IEEE Press Piscataway, NJ, USA © 2007.

(Continued)

*Primary Examiner* — Romain Jeanty
(74) *Attorney, Agent, or Firm* — McGlinchey Stafford, PLLC; R. Andrew Patty, II

(57) ABSTRACT

A computer apparatus and method for analyzing and improving industrial turnaround or construction project manpower estimates. The apparatus comprises one or more processors in operative communication with one or more data stores and with at least one tangible medium upon which is encoded machine-readable software, the software, upon its execution, being configured so that the system carries out a process for analyzing and adjusting manpower cost estimates, outputting actionable results for display to users, and archiving and aggregating project execution data for use in future project analyzes to improve analysis and estimation accuracy over time by feeding back into the system data indicative of the scale and sources of historical execution inefficiencies.

13 Claims, 20 Drawing Sheets

TA Project Risk Analysis Process Overview

(56) References Cited

U.S. PATENT DOCUMENTS

| | | | |
|---|---|---|---|
| 8,798,987 B2 | 8/2014 | McLaughlin et al. | |
| 2003/0023470 A1* | 1/2003 | Labbi | G06Q 10/06313 705/7.23 |
| 2003/0055695 A1* | 3/2003 | Mori | G06Q 10/06 705/7.28 |
| 2003/0101089 A1* | 5/2003 | Chappel | G06Q 10/06 705/7.17 |
| 2003/0167265 A1 | 9/2003 | Corynen | |
| 2003/0225605 A1* | 12/2003 | Yokota | G06Q 10/063118 705/7.17 |
| 2004/0138897 A1* | 7/2004 | Eapen | G06Q 10/06 705/7.12 |
| 2005/0197856 A1* | 9/2005 | Drucker | G06Q 10/0635 705/313 |
| 2006/0136328 A1* | 6/2006 | Angermeier | G06Q 10/06 705/38 |
| 2006/0173762 A1* | 8/2006 | Clater | G06Q 10/06 705/35 |
| 2006/0259336 A1* | 11/2006 | Anas | G06Q 10/04 705/7.17 |
| 2007/0100775 A1 | 5/2007 | Vyas | |
| 2007/0255583 A1* | 11/2007 | Dreimann | G06Q 10/0635 705/7.28 |
| 2008/0082345 A1 | 4/2008 | Greiner et al. | |
| 2008/0103859 A1* | 5/2008 | Yokota | G06Q 10/063118 705/7.28 |
| 2008/0255910 A1* | 10/2008 | Bagchi | G06Q 10/06 705/7.28 |
| 2008/0288321 A1 | 11/2008 | Dillon et al. | |
| 2009/0070188 A1* | 3/2009 | Scott | G06Q 40/08 705/7.28 |
| 2009/0327048 A1 | 12/2009 | Kisin et al. | |
| 2010/0030609 A1* | 2/2010 | Ramanathan | G06Q 10/06 705/7.28 |
| 2011/0202385 A1 | 8/2011 | Matsui et al. | |
| 2011/0270644 A1* | 11/2011 | Roncolato | G06Q 10/06 705/7.22 |
| 2012/0016714 A1* | 1/2012 | Apte | G06Q 10/06 705/7.28 |
| 2012/0072251 A1* | 3/2012 | Mircean | G06Q 10/063 705/7.11 |
| 2012/0265559 A1* | 10/2012 | Colagiovanni, Jr. | G06Q 10/06 705/4 |
| 2012/0290104 A1 | 11/2012 | Holt et al. | |
| 2013/0041711 A1* | 2/2013 | Girard | G06Q 10/0635 705/7.28 |
| 2013/0282557 A1* | 10/2013 | Allin | G06Q 30/00 705/38 |
| 2014/0136276 A1* | 5/2014 | Creagh | G06Q 10/0635 705/7.28 |
| 2014/0236666 A1* | 8/2014 | Gifford | G06Q 10/0635 705/7.28 |
| 2014/0236667 A1* | 8/2014 | Gifford | G06Q 10/0635 705/7.28 |

OTHER PUBLICATIONS

Kiziltas, Semiha, et al., "Contextual Information Requirements of Cost Estimators From Past Construction Projects", Journal of Construction Engineering and Management, V 135, n. 9, p. 841-852; Sep. 2009.

Lawrence, Gordon R., "A Review of the Current State of Cost Estimating for Maintenance Turnarounds", Asset Performance Networks, Cost Engineering Event, 2013, p. 1-15.

CII Performance Assessment 2015 Edition brochure, https://www.construction-institute.org/bpp/2015_brochure_final.pdf (published in 2015) (12 pages).

"Turnaround Network AP Networks", http://ap-networks.com/innovative-web-based-tools/turnaround-network/, visited Jul. 13, 2017 (Copyright 2001-2017) (2 pages).

AP Networks "Facilated Turnaround Risk Workshop", http://ap-networks.com/turnarounds/facilitated-turnaround-risk-workshop/, visited Jul. 13, 2017 (Copyright 2001-2017) (2 pages).

dos Santos, Roberto Barbosa, et al., "Risk Level Assessment in Construction Projects Using the Schedule Performance Index", Journal of Construction Engineering, vol. 2016, pp. 1-8.

"CII Performance Assessment", https://www.construction-institute.org/scriptcontent/bmm.cfm?section=pa, visited Jul. 13, 2017 (Copyright 2017) (1 page).

CII Performance Assessment 2014 Edition brochure, https://www.construction-institute.org/nextgen/publications/brochure/2014brochure.pdf (Copyright 2017) (12 pages).

"CII Learn About Benchmarking", https://www.construction-institute.org/nextgen/learn.cfm, visited Jul. 13, 2017 (Copyright 2017) (1 page).

CII Benchmarking & Metrics Brochure, http://www.prosjektnorge.no/files/pages/635/presentasjoner_workshop_april2014/bjm.pdf (publication date unknown)(17 pages).

Rasool, Mehdizadeh, et al., "Methodology and tools for risk evaluation in construction projects using Risk Breakdown Structure" European Journal of Environmental and Civil Engineering, vol. X-No. X/2011, pp. 1-23.

Ugwa, O.O., et al, Key performance indicators and assessment methods for infrastructure sustainability—A South African consruction industry perspective, Building and Environment, vol. 42, Issue 2, Feb. 2007, pp. 665-680 (17 pages).

Sharma, Satyendra Kumar, et al., "Risk Management in Construction Projects" Asia-Pacific Journal of Management Research and Innovation, vol. VII, No. 3, Jul.-Sep. 2011, pp. 107-120 (14 pages).

AP Networks, "Benchmarking and Predicitive Analytics", http://ap-networks.com/benchmarking-predictive-analytics/, visited Jul. 14, 2017 (Copyright 2001-2017) (3 pages).

* cited by examiner

| TA Project Risk Analysis Data Summary | | | | |
|---|---|---|---|---|
|  | Planned | Projected (Planned + Initial Risk) | Current Adjusted Final Estimate | Final Risk |
| Total TA Cost | $36,000,000 | $48,480,094 | $41,903,987 | $5,903,987 |
| Total TA Manhours (pre, execution, post, contingency) | 240,000 | 323,201 | 278,927 | 38,927 |
| Composite Manhour Rate | $150 | | | |
| Baseline TA Execution Manhours (no contingency) | 128,000 | | | |
| Estimated Pre TA Manhours | 45,000 | | | |
| Estimated Post TA Manhours | 27,000 | | | |
| Total Base TA Estimated Manhours (Pre, Execution, Post) | 200,000 | | | |
| Addenda Work Scope Growth % | 7.00% | 12.00% | 9.50% | 2.50% |
| Addenda Estimated Manhours | 14,000 | 24,000 | 19,000 | 5,000 |
| Planned TA Execution Manhours (No Pre & Post) | 142,000 | 152,000 | 147,000 | 5,000 |
| Discovery Work Scope Growth % | 8.00% | 12.00% | 10.00% | 2.00% |
| Discovery Work Scope Growth Manhours | 16,000 | 24,000 | 20,000 | 4,000 |
| Planned TA Execution Manhours with Discovery Scope Growth | 158,000 | 176,000 | 167,000 | 9,000 |
| Field Change Order (FCO) % | 5.00% | 7.00% | 6.12% | 1.12% |
| Field Change Order (FCO) Manhours | 10,000 | 14,000 | 12,240 | 2,240 |
| Total Planned TA Execution Manhours | 168,000 | 190,000 | 179,240 | 11,240 |
| Inefficiency Manhours Included in Baseline TA Manhours | 43,556 | 43,556 | 43,556 | 0 |
| Inefficiency Manhours NOT INCLUDED in Baseline Manhours | | 61,201 | 27,687 | 27,687 |
| Bare TA Execution Manhours (Total Forecasted TA Execution Manhours minus Inefficiency Manhours Included in Baseline Manhours) | 124,444 | 124,444 | 124,444 | 0 |
| Total Forecasted TA Execution Manhours | 168,000 | 251,201 | 206,927 | 38,927 |

Fig. 2

| Risk Determinative Condition - Potential Inefficiency Contributor Data | |
|---|---|
| Category: Labor Logistical Inefficiencies | Turnaround |
| Shifting (# of shifts per day) * | 2 |
| Hours per Shift (shift schedule) * | 10 |
| # of work breaks per shift * | 2 |
| Average time in minutes from work stop, to hand wash, to break area * | 5 |
| Time allowed for work breaks * | 15 |
| Average time from break area, back to work area, and commence work * | 10 |
| Average break time per worker in minutes | 60 |
| Average time from work stop, to hand wash, to lunch area * | 10 |
| Time allowed for lunch break * | 30 |
| Average time from lunch area, back to work area, and commence work * | 10 |
| Average lunch time per worker | 50 |
| # of safety meetings per day * | 1 |
| Average duration of safety meeting * | 15 |
| Average safety meeting time per worker | 15 |
| Total Logistical Inefficiency Time per Worker | 125 |
| Labor Logistical inefficiency estimating multiple (Projected) | 0.2083 |
| Labor Logistical inefficiency estimating multiple (Planned) * | 0.1000 |
| Labor Logistical inefficiency estimating multiple (Delta / Risk) | 0.108 |
| LaborLogistical Inefficiency Manhours (Delta / Risk) | 13481 |

\* Denotes Data Input *(all other fields calculated)*

Fig. 3

| Risk Determinative Condition - Potential Inefficiency Contributor Data | |
|---|---|
| Category: Extended Unit Shutdown & Decon | Turnaround |
| # of Days in S/D & Decon Plan * | 6 |
| Actual # of S/D & Decon Days * | 8.0 |
| Avg Scheduled "Earned Manhours" per Day | 6461.5 |
| % of Planned Work Affected by Extended S/D & Decon Window * | 70% |
| Unit S/D Plan Compliance Manhour Estimating Multiple (Projected) | 0.073 |
| Unit S/D Plan Compliance Manhours (Projected) | 9046 |
| Unit S/D Plan Compliance Manhour Estimating Multiple (Planned) * | 0.000 |
| Unit S/D Plan Compliance Manhours (Planned) | 0 |
| Unit S/D Plan Compliance Manhour Estimating Multiple (Delta / Risk) | 0.0727 |
| Unit S/D Plan Compliance Manhours (Delta / Risk) | 9046 |

\* Denotes Data Input *(all other fields calculated)*

Fig. 4

| Risk Determinative Condition - Potential Inefficiency Contributor Data | |
|---|---|
| Category: Extended Unit Commissioning & Start Up | Turnaround |
| # of Days in Comm / Start-up Plan * | 5 |
| Actual # of Comm / Start-up Days * | 5.0 |
| Anticipated Staffing Level per Shift During Unit Comm / Start-up (Company & Contractor) * | 30 |
| Unit Start Up Plan Compliance Manhour Estimating Multiple (Projected) | 0.0000 |
| Unit Start Up Plan Compliance Manhours (Projected) | 0 |
| Unit Start Up Plan Compliance Manhours Estimating Multiple (Planned) * | 0.000 |
| Unit Start Up Plan Compliance Manhours (Planned) | 0 |
| Unit Start Up Plan Compliance Estimating Multiple (Delta / Risk) | 0.0000 |
| Unit Start-Up Plan Compliance Manhours (Delta / Risk) | 0 |

Fig. 5

* Denotes Data Input *(all other fields calculated)*

| Risk Determinative Condition - Potential Inefficiency Contributor Data | |
|---|---|
| Category: Poor Decon - Equipment Prep | Turnaround |
| # of Jobs Involved in Opening Process Equipment & Piping * | 400 |
| # of Jobs Requiring a 1 time Further Prep Work or Permit Delay * | 30 |
| Avg Scheduled "Earned Manhours" per shift * | 3231 |
| Avg Manhours Earn Rate per Shift, per Permit | 32.31 |
| Average % of Manhours Earn Rate per Permit Lost (redirected resources)* | 70% |
| Equipment Prep Efficiency Manhour Estimating Multiple (Projected) | 0.0055 |
| Equipment Prep Efficiency Manhours (Projected) | 678 |
| Equipment Prep Efficiency Multiple (Planned) * | 0.00 |
| Equipment Prep Efficiency Manhours (Planned) | 0 |
| Equipment Prep Efficiency Estimating Multiple (Delta / Risk) | 0.0055 |
| Equipment Prep Efficiency Manhours (Delta / Risk) | 678 |

Fig. 6

\* Denotes Data Input *(all other fields calculated)*

| Risk Determinative Condition - Potential Inefficiency Contributor Data | |
|---|---|
| Category: Peripheral Impact | Turnaround |
| # of Shifts in plan for peripheral site delays * | 0.00 |
| Actual # of shifts of peripheral site delays * | 2.000 |
| Avg Scheduled "Earned Manhours" per shift * | 3230.77 |
| % of Planned Work Affected by Peripheral Impact * | 100% |
| Peripheral Impact Manhour Estimating Multiple (Projected) | 0.0519 |
| Peripheral Delay Impact Manhours (Projected) | 6462 |
| Peripheral Delay Impact Manhour Estimating Multiple (Planned) * | 0.0000 |
| Peripheral Delay Impact Manhours (Planned) | 0 |
| Peripheral Delay Impact Manhour Estimating Multiple (Delta / Risk) | 0.0519 |
| Peripheral Delay Impact Manhours (Delta / Risk) | 6462 |

Fig. 7

\* Denotes Data Input *(all other fields calculated)*

| Risk Determinative Condition - Potential Inefficiency Contributor Data | |
|---|---|
| Category: Unbudgeted Permit Delays | Turnaround |
| Hours per Shift (shift schedule) * | 10 |
| Total Estimated # of Permits Issued per Shift Including Projects * | 100 |
| Avg Scheduled "Earned Manhours" per shift * | 3230.77 |
| Avg Manhours Earn Rate per Shift, per Permit | 32.31 |
| "Average Permit Time" (minutes) * | 30.00 |
| Calculated "Average Permit Time" Factor | 0.050 |
| % of permits with "Average Permit Time" * | 70% |
| Total added manhours from "Average Permit Time" per shift | 113.08 |
| "Moderate Permit Time" (minutes) * | 30 |
| Calculated "Moderate Permit Time" Factor | 0.050 |
| % permits with "Moderate Permit Time" * | 20% |
| Total added manhours from "Moderate Permit Time" per shift | 32.31 |
| "Extreme Permit Time" (minutes) * | 90 |
| Calculated "Extended Permit Time" Factor | 0.150 |
| % of permits with "Extended Permit Time" * | 10% |
| Total added manhours from "Extended Permit Time" per shift | 48.46 |
| Overall Total Added Manhours from Permitting per shift | 193.85 |
| Work Permitting Manhour Estimating Multiple (Projected) | 0.081 |
| Work Permitting Manhour Estimating Multiple (Planned) * | 0.050 |
| Work Permitting Manhour Estimating Multiple (Delta / Risk) | 0.031 |
| Work Permitting Manhours (Delta / Risk) | 3858 |

* Denotes Data Input *(all other fields calculated)*

Fig. 8

| Risk Determinative Condition - Potential Inefficiency Contributor Data | |
|---|---|
| Category: Unbudgeted Scope Growth (Addenda & Discovery) | Turnaround |
| Addenda Scope Growth Estimating Multiple (Projected) * | 0.120 |
| Addenda Scope Growth Manhours (Projected) * | 24,000 |
| Addenda Scope Growth Estimating Multiple (Planned) * | 0.070 |
| Addenda Scope Growth Manhours (Planned) | 14000 |
| Addenda Scope Growth Estimating Multiple (Delta / Risk) | 0.0500 |
| Addenda Scope Growth Manhours (Delta / Risk) | 10000 |
| Discovery Work Scope Growth Estimating Multiple (Projected) | 0.120 |
| Discovery Work Scope Growth Manhours (Projected) | 24,000 |
| Discovery Work Scope Growth Estimating Multiple (Planned) * | 0.080 |
| Discovery Work Scope Growth Manhours (Planned) | 16000 |
| Discovery Work Scope Growth Estimating Multiple (Delta / Risk) | 0.0400 |
| Discovery Work Scope Growth Manhours (Delta / Risk) | 8000 |

Fig. 9

\* Denotes Data Input *(all other fields calculated)*

| Risk Determinative Condition - Potential Inefficiency Contributor Data | |
|---|---|
| Category: Regional Economics, Supervision & Crafts | Turnaround |
| Productivity % embedded in estimating standard * | 0.70 |
| Economic Activity (construction volume) productivity impact (Projected) * | 0.40 |
| Caliber of Supervision productivity impact (Projected) * | 0.40 |
| Experience of Crafts productivity impact (Projected) * | 0.40 |
| *Average* of Regional Economics, Supervision, & Crafts Productivity (Projected) | 0.40 |
| Differential Between Productivity Embedded in Standard & Projected | 0.30 |
| Regional Economics, Supervision, & Crafts inefficiency factor (Adjusted) | 0.30 |
| Regional Economics, Supervision, & Crafts inefficiency Manhours (Adjusted) | 37333 |
| Regional Economics, Supervision, & Crafts inefficiency factor (Planned) * | 0.20 |
| Regional Economics, Supervision, & Crafts inefficiency Manhours (Planned) | 24888.8 |
| Regional Economics, Supervision, & Crafts Estimating Multiple (Delta/Risk) | 0.10 |
| Regional Economics, Supervision, & Crafts Inefficiency Manhours (Delta/Risk) | 12444 |

\* Denotes Data Input *(all other fields calculated)*

Fig. 10

| Risk Determinative Condition - Potential Inefficiency Contributor Data | |
|---|---|
| Category: Equipment Transition (Ops., Maint., Insp.) Efficiency | Turnaround |
| Hours per Shift (shift schedule) * | 10 |
| # of Fixed Equipment in TA Scope (Projects= # of jobs with hold points and transfers) * | 70 |
| Estimated Fixed Equipment Manhours (field labor) * | 120,000 |
| Avg Manhours per Equipment | 1714 |
| Avg % Duration Time Equipment in Maintenance Window * | 70% |
| Avg Manpower Loading per shift per Equipment | 4.71 |
| # of Equipment Transitions per Equipment * | 7 |
| Avg Duration Time per Transition (minutes) * | 60 |
| Calculated Total Transition Manhours per Equipment | 32.97 |
| Equipment Transition Manhour Estimating Multiple (Projected) | 0.0185 |
| Equipment Transition Manhours (Projected) | 2308 |
| Equipment Transition Manhour Estimating Multiple (Planned)* | 0.00 |
| Equipment Transition Manhours (Planned) | 0 |
| Equipment Transition Manhours Estimating Multiple (Delta / Risk) | 0.0185 |
| Equipment Transition Manhours (Delta / Risk) | 2308 |

\* Denotes Data Input *(all other fields calculated)*

Fig. 11

| Risk Determinative Condition - Potential Inefficiency Contributor Data | |
|---|---|
| Category: Weather Delays | Turnaround |
| # of Shifts in plan for weather delays * | 0.0 |
| Actual # of weather delay shifts * | 2.00 |
| Avg Scheduled "Earned Manhours" per shift * | 3230.77 |
| % of Planned Work Affected by Weather Delays * | 100% |
| Weather Delay Impact Manhour Estimating Multiple (Projected) | 0.0519 |
| Weather Delay Impact Manhours (Projected) | 6462 |
| Weather Delay Impact Manhour Estimating Multiple (Planned) * | 0.000 |
| Weather Delay Impact Manhours (Planned) | 0 |
| Weather Delay Impact Manhour Estimating Multiple (Delta / Risk) | 0.0519 |
| Weather Delay Impact Manhours (Delta / Risk) | 6462 |

\* Denotes Data Input *(all other fields calculated)*

Fig. 12

| Risk Determinative Condition - Potential Inefficiency Contributor Data | |
| --- | --- |
| Category: Housekeeping Delays | Turnaround |
| # of shifts in plan for shutdown of TA for housekeeping * | 0.00 |
| Actual # of shifts for housekeeping shutdown delays * | 2.000 |
| Avg Scheduled "Earned Manhours" per shift * | 3230.77 |
| % of Planned Work Affected by shutdown for housekeeping * | 100% |
| Housekeeping Shutdown Manhour Estimating Multiple (Projected) | 0.0519 |
| Housekeeping Shutdown Manhours (Projected) | 6462 |
| Housekeeping Shutdown Manhour Estimating Multiple (Planned) * | 0 |
| Housekeeping Shutdown Impact Manhours (Planned) | 0 |
| Housekeeping Shutdown Manhour Estimating Multiple (Delta / Risk) | 0.0519 |
| Housekeeping Shutdown Manhours (Delta / Risk) | 6462 |

Fig. 13

\* Denotes Data Input *(all other fields calculated)*

| Risk Determinative Condition - Potential Inefficiency Contributor Data | |
|---|---|
| Category: Unbudgeted Contingency - (Field Change Order) - FCO | Turnaround |
| Contingency Estimating Multiple (Projected) * | 0.070 |
| Contingency Manhours (Projected) | 14,000 |
| Contingency Estimating Multiple (Planned) * | 0.050 |
| Contingency Manhours (Planned) | 10,000 |
| Contingency Multiple (Delta / Risk) | 0.0200 |
| Contingency Manhours (Delta / Risk) | 4000 |

Fig. 14

\* Denotes Data Input *(all other fields calculated)*

| (Initial) Risk Determinative Condition Summary | Turnaround | |
|---|---|---|
| Category | Manhours | Cost |
| Extended Unit Shutdown & Decon | 9,046 | $1,356,923 |
| Extended Unit Commissioning & Start-up | 0 | $0 |
| Poor Decontamination (Equipment Prep) | 678 | $101,769 |
| Peripheral Impact | 6,462 | $969,231 |
| Unbudgeted Permit Delays | 3,858 | $578,667 |
| Unbudgeted Scope Growth (Addenda & Discovery) | 18,000 | $2,700,000 |
| Labor Logistical Inefficiencies | 13,481 | $2,022,222 |
| Regional Economics, Supervision, & Crafts | 12,444 | $1,866,667 |
| Equipment Transition Efficiency | 2,308 | $346,154 |
| Weather Delays | 6,462 | $969,231 |
| Housekeeping Delays | 6,462 | $969,231 |
| Unbudgeted Contingency (Field change order) | 4,000 | $600,000 |
| Total Initial Risk | 83,201 | $12,480,094 |

Fig. 15

Risk Determination Summary

| Risk Determinative Condition Category | Initial Risk | Probability of Occurrence | Quantified Risk | Mitigate Y/N | Probability of Mitigation | Cost of Mitigation | Final Risk |
|---|---|---|---|---|---|---|---|
| Extended Unit Shut-Down & Decontamination | $1,356,923 | 70% | $949,846 | Y | 50% | $20,000 | $494,923 |
| Extended Unit Commissioning & Start-up | $0 | 100% | $0 | N | 0% | $0 | $0 |
| Poor Decontamination for Equipment Preparation | $101,769 | 100% | $101,769 | Y | 75% | $20,000 | $45,442 |
| Peripheral Impact | $969,231 | 50% | $484,615 | N | 0% | $0 | $484,615 |
| Unbudgeted Permit Delays | $578,667 | 70% | $405,067 | Y | 40% | $5,000 | $248,040 |
| Unbudgeted Scope Growth (Addenda + Discovery) | $2,700,000 | 50% | $1,350,000 | N | 0% | $0 | $1,350,000 |
| Labor Logistical Inefficiency | $2,022,222 | 70% | $1,415,556 | Y | 30% | $0 | $990,889 |
| Regional Economics, Supervision, & Crafts | $1,866,667 | 70% | $1,306,667 | Y | 10% | $0 | $1,176,000 |
| Equipment Transition Inefficiency | $346,154 | 100% | $346,154 | Y | 35% | $5,000 | $230,000 |
| Weather Delays | $969,231 | 60% | $581,538 | Y | 20% | $0 | $465,231 |
| Housekeeping Delays | $969,231 | 70% | $678,462 | Y | 90% | $10,000 | $77,846 |
| Unbudgeted Contingency (Field Change Order) | $600,000 | 80% | $480,000 | Y | 30% | $5,000 | $341,000 |
| Total | $12,480,094 | | $8,099,674 | | | $70,000 | $5,903,987 |

Fig. 16

SYSTEM AND METHOD FOR INDUSTRIAL PROJECT COST ESTIMATION RISK ANALYSIS

REFERENCE TO RELATED APPLICATIONS

Claim is hereby made to the benefit of the priority of U.S. Provisional Patent Appl. No. 61/881,301, filed on Sep. 23, 2013, the disclosure of which is incorporated herein by reference.

TECHNICAL FIELD

The subject of this disclosure is in the technical field of computerized systems and methods for analyzing risk associated with manpower costs and schedules for industrial turnaround maintenance and construction project execution.

SUMMARY OF THE INVENTION

Accurate cost estimates for manpower involved in industrial construction or industrial maintenance project execution, including for example turnaround projects in the chemical, oil & gas, paper and agricultural processing industries, are critical to both vendors and buyers of industrial construction and maintenance services. In large projects involving complex systems, preparing such estimates accurately can be a highly complex endeavor, in part because of the volume of variable cost-driving conditions involved and the number and diversity of contingent risks involving manpower productivity which may or may not be realized during execution of a given project. Historically, the assessment of the accuracy of project estimates in this industrial space, especially as it relates to manpower productivity, has been an exercise in reliance upon trial and error, and upon the ability of documented records and human personnel to accurately reconstruct historical risk factor experience from previous related projects.

For at least these reasons, a significant need continues to exist for a more efficient, systematic approach to analysis of manpower cost and time schedule estimates for such projects, which more accurately evaluates and measures project risk and risk mitigation potential, in order to ultimately produce project manpower cost and/or schedule estimates with greater accuracy, resulting in greater cost savings and ultimately greater profitability.

The invention which is the subject of this disclosure addresses this and other needs by providing, in at least one aspect, a computer apparatus or system for analyzing industrial turnaround project execution estimates, or construction project execution estimates, or turnaround and construction project execution estimates. In this aspect of the invention, the apparatus comprises one or more data stores, one or more processors in operative communication with the data stores, and one or more tangible computer-readable media upon which is encoded machine-readable software which, upon its execution, is configured so that the system carries out a process comprising:

receiving from one or more user interfaces, and storing in one or more of the data stores, current estimated data expressed initially as, or convertible into, and one or more of current estimated cost data, current estimated man-hour data and current estimated duration data, attributable a plurality of risk-determinative conditions for one or more project tasks;

receiving from one or more of the user interfaces, and storing in one or more of the data stores, historical estimated potential inefficiency contributor data expressed initially as, or convertible into, one or more of historical estimated cost data, historical estimated man-hour data and historical estimated duration data, attributable to each of the risk-determinative conditions for the project tasks;

receiving from one or more of the user interfaces, and storing in one or more of the data stores, one or more quantitative adjustments to the current estimated data and the historical estimated potential inefficiency contributor data, which quantitative adjustments at least in part account for either anomalous historical risk which is no longer anticipated with respect to the historical estimated potential inefficiency contributor data, or newly known risk which is anticipated with respect to the current estimated data, or both, and by means of the processors summing the quantitative adjustments, if any, respectively with the current estimated data and the historical estimated potential inefficiency contributor data attributable to each of the risk-determinative conditions for the project tasks, to yield validated current estimated data and validated historical estimated potential inefficiency contributor data attributable to each of the risk-determinative conditions for the project tasks;

calculating by means of one or more of the processors a difference between a current estimated inefficiency factor applied to the validated current estimated data and a projected inefficiency factor applied to the validated historical estimated potential inefficiency contributor data for each of the risk-determinative conditions for each of the project tasks, to yield an initial risk value for each of the risk-determinative conditions for each of the project tasks;

receiving from one or more of the user interfaces, and storing in one or more of the data stores, a probability of occurrence for each of the risk-determinative conditions and calculating a quantified value of risk for each of the risk-determinative conditions by multiplying each of the initial risk values by the respective probability of occurrence;

receiving from one or more of the user interfaces, and storing in one or more of the data stores, a probability of mitigation success for each of the risk-determinative conditions and any cost of mitigation to be undertaken;

calculating by means of one or more of the processors a final risk value for each of the risk-determinative conditions, by multiplying each probability of mitigation success by the respective quantified value of risk for each of the risk-determinative conditions, and summing the resulting product with the cost of mitigation to be undertaken; and generating by means of one or more of the processors a final risk value output configured to enable a representation of the final risk value for each of the risk-determinative conditions to be electronically displayed.

Although not required in all aspects of the invention, the computer system software may be configured further so that the process carried out further comprises calculating by means of one or more of the processors adjusted estimated costs, adjusted estimated man-hours and adjusted estimated duration for each of the project tasks, by summing the current estimated costs, current estimated duration and current estimated man-hours for each of the project tasks, with the sum of all of the final risk values for the risk-determinative conditions for each of the project tasks respectively; and generating by means of one or more of the processors an adjusted estimates output configured to enable a representation of the adjusted estimated costs, adjusted estimated man-hours and adjusted estimated duration for each of the project tasks respectively, for the project as a whole, or for both, to be electronically displayed.

In some aspects of the invention, the computer system also may further comprise a display configured to receive the final risk value output, the adjusted estimates output, or both, and to display their respective representation(s). Also in some aspects of the invention, it may be preferred that the quantitative adjustments to the current estimated data and the historical estimated potential inefficiency contributor data, be prepared by a process comprising conducting one or more collaborative interviews with a first plurality of personnel experienced in comparable project execution, and that the probability of occurrence for each of the risk-determinative conditions and the probability of mitigation success for each for each of the risk-determinative conditions each be determined by collaborative consensus amongst a second plurality of personnel (which for purposes of all embodiments of this invention, unless otherwise indicated herein, may be the same or different from the first plurality of personnel) experienced in comparable project execution.

In another embodiment of the invention, a computerized method of preparing an industrial turnaround or construction project execution estimate analysis is provided. The method comprises:

receiving from one or more computer interfaces, and storing in one or more data stores, current estimated data expressed initially as, or convertible into, one or more of current estimated cost data, current estimated man-hour data and current estimated duration data, attributable to a plurality of risk-determinative conditions for one or more project tasks;

receiving from one or more of the computer interfaces, and storing in one or more of the data stores, historical estimated potential inefficiency contributor data expressed initially as, or convertible into, one or more of historical estimated cost data, historical estimated man-hour data and historical estimated duration data, attributable to the risk-determinative conditions for the project tasks;

conducting one or more collaborative interviews with a first plurality of personnel experienced in comparable project execution, so as to develop one or more quantitative adjustments to the current estimated data and the historical estimated potential inefficiency contributor data, which quantitative adjustments at least in part account for either anomalous historical risk which is no longer anticipated with respect to the historical estimated potential inefficiency contributor data, or new known risk which is anticipated with respect to the current estimated data, or both;

receiving from one or more of the computer interfaces, and storing in the data stores, the one or more quantitative adjustments to the current estimated data and the historical estimated potential inefficiency contributor data attributable to the risk-determinative conditions for the project tasks, and summing, by means of one or more processors in operative communication with the data stores, the quantitative adjustments, if any, respectively with the current estimated data and the historical estimated potential inefficiency contributor data attributable to each of the risk-determinative conditions for the project tasks, to yield validated current estimated data and validated historical estimated potential inefficiency contributor data attributable to each of the risk-determinative conditions for each of the project tasks;

calculating by means of one or more of the processors a difference between a current estimated inefficiency factor applied to the validated current estimated data and a projected inefficiency factor applied to the validated historical estimated potential inefficiency contributor data for each of the risk-determinative conditions for each of the project tasks, to yield an initial risk value for each of the risk-determinative conditions for each of the project tasks;

conducting one or more collaborations with a second plurality of personnel experienced in comparable project execution, in order to establish by consensus a probability of occurrence for each of the risk-determinative conditions and a probability of mitigation success for each of the risk-determinative conditions;

receiving from one or more of the computer interfaces, and storing in one or more of the data stores, the probability of occurrence for each of the risk-determinative conditions and calculating, by means of one or more of the processors, a quantified value of risk for each of the risk-determinative conditions by multiplying each of the initial risk values by the respective probability of occurrence;

receiving from one or more of the computer interfaces, and storing in one or more of the data stores, the probability of mitigation success for each of the risk-determinative conditions;

computing, by means of one or more of the processors, a final risk value for each of the risk-determinative conditions, by multiplying each probability of mitigation success by the respective quantified value of risk for each of the risk-determinative conditions, and summing the resulting product with any cost of mitigation to be undertaken; and generating, by means of one or more of the processors, a final risk value output configured to enable a representation of the final risk value for each of the risk-determinative conditions to be electronically displayed.

In some aspects of the invention, the above computerized method further comprises:

calculating, by means of one or more of the processors, adjusted estimated costs, adjusted estimated man-hours and adjusted estimated duration for each of the project tasks, by summing the current estimated costs, current estimated duration and current estimated man-hours for the project task, with an aggregate of the risk values, respectively, calculated for all of the plurality of risk-determinative conditions for the project task; and generating for display, by means of the processors, an output of the adjusted estimated costs, adjusted estimated man-hours and adjusted estimated duration for each of the project tasks.

In some particular aspects of the invention, the method further comprises displaying on a display the output of the adjusted estimated costs, adjusted estimated man-hours and adjusted estimated duration for each of the project tasks, for the project as a whole, or for both.

In yet another aspect of the invention, information about the realized inefficiencies in terms of realized costs, realized man-hour and realized duration inefficiencies for each of the risk determinative conditions is fed back into the databases of the system for use in calculating realized inefficiency values (in monetary terms) and realized risk for each of the risk-determinative conditions and the project tasks. Thus, in this aspect, the system of this invention comprises software which is further configured so that, upon its execution, the process carried out by the system further comprises:

receiving from one or more of the user interfaces, and storing in one or more of the data stores, realized potential inefficiency contributor data (which typically will be collected, e.g., by monitoring a project task in execution) expressed initially as, or convertible into, one or more of realized cost data, realized man-hour data and realized duration data, attributable to each of the plurality of risk-determinative conditions for the one or more project tasks;

calculating, by means of the processors, the difference between the validated historical estimated potential inefficiency contributor data and the realized potential inefficiency contributor data for each of the risk-determinative conditions for each of the project tasks, to yield a realized actual inefficiency value for each of the risk-determinative conditions for each of the project tasks; and calculating, by means of the processors, a realized risk for each of the risk-determinative conditions for each of the project tasks by subtracting the realized actual inefficiency value from the final risk previously calculated respectively for each of the risk-determinative conditions for each of the project tasks.

In some aspects of the invention, the information about the realized inefficiencies in the project which was fed back into the databases of the system to calculate realized inefficiency values and realized risk, is also used as historical, real-world benchmark data in future project analyses run by the system. Thus, in this particular aspect, the process carried out by the system further comprises:

employing the stored, realized potential inefficiency contributor data of the one or more project tasks as historical estimated potential inefficiency contributor data and repeating the foregoing steps with respect to current estimated data specific to another set of one or more project tasks of a different project, so as to calculate, by means of one or more of the processors, initial risk values for the one or more risk-determinative conditions of the one or more project tasks of the different project.

In this way, the process leverages past project experience and puts that historical information to use in future estimation and execution risk analyses, enabling users to do so across multiple projects, potentially on a massive scale.

These and other embodiments, features and advantages of the subject matter of this disclosure are made even more apparent by the following detailed description, including the accompanying drawings and appended claims.

BRIEF DESCRIPTION OF THE DRAWINGS

FIG. 2 is an output display produced by the system of FIG. 1, illustrating a representation of various data input regarding current estimated (planned) and projected results, regarding a hypothetical project using the system of FIG. 1.

FIGS. 3-14 are output displays produced by the system of FIG. 1, each illustrating a representation of key data in the form of historical potential inefficiency contributor data gathered and input to, and output calculated by, the system of FIG. 1 for a plurality of risk-determinative conditions for the hypothetical project of FIG. 2.

FIG. 15 is another output display produced by the system of FIG. 1, illustrating a representation of initial risk value calculations made by the system for all of the risk-determinative conditions of the hypothetical project of FIG. 2.

FIG. 16 is another output display produced by the system of FIG. 1, illustrating a representation of initial, quantified and final risk calculations across all of the risk-determinative conditions for the hypothetical project of FIG. 2

Like reference numbers or letters employed amongst the various figures are used to refer to like elements or process steps, as the case may be.

FURTHER DETAILED DESCRIPTION OF THE INVENTION

Figure 1:
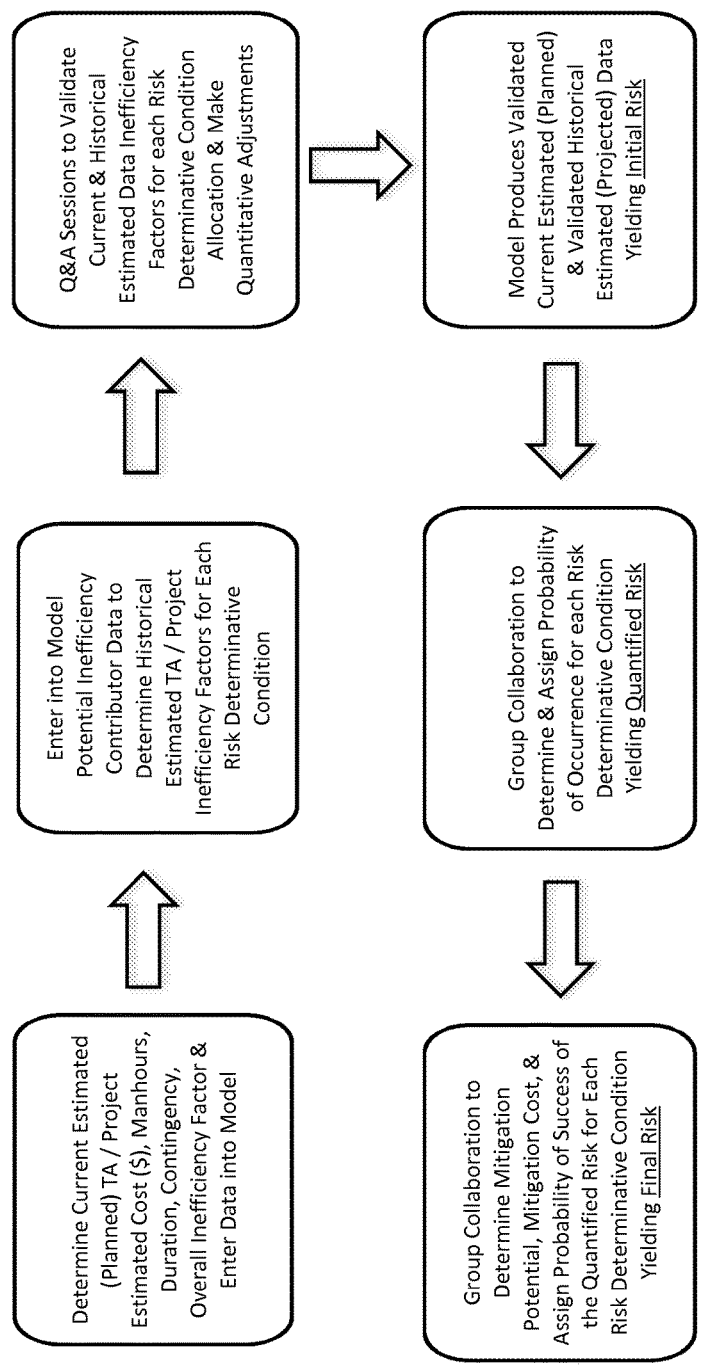
FIG. 1 is schematic flow diagram of a process carried out using a system configured and operated in accordance with one aspect of the invention.

As will now become further apparent, the subject matter of this disclosure enables a very detailed, highly efficient and effective analysis of the risk-determinative conditions involved in various tasks necessary to complete an industrial turnaround maintenance or construction project, in order to provide appropriately validated and risk-weighted adjustments to estimates of task and/or project data such as, e.g., man-hours, duration and cost. The system and method provide validation of current estimated and historical estimated man-hour, duration and cost data, for example, associated with events or conditions typically involved in the relevant project which can impact the itemized and aggregate estimated totals. The validation process uses quantitative adjustments to both current and historical project estimates, such adjustments being derived from both the inputs provided in answering a series of questions about historical project potential inefficiency contributors for each of a plurality of risk-determinative conditions, as well as human input gathered by interviews with experienced personnel. Once validated, the historical and current estimated data for the variable conditions or events are risk adjusted, by taking into account the probability of risk occurrence and the probability of risk mitigation success, both of which are derived from historical experience and human consensus input gathered in collaborative sessions involving experienced personnel. Values are then assigned to the risk associated with the current estimates for the project at hand, rapidly providing a clear picture of the value of probable risk involved in the project as estimated, and revealing the areas of opportunity for risk mitigation and estimation process improvement.

For purposes of this invention disclosure, risk-determinative conditions are those conditions which could impact cost or schedule duration in the project involved, identified from experience on prior projects or industry standards or norms. For the system and method of this invention, the risk-determinative conditions may include, for example:
Extended unit shut down and decontamination
Extended unit Commissioning & Start-up
Poor decontamination for equipment preparation
Peripheral impacts (interruptions due to events outside of the project execution which impact the project cost, duration and/or man-hours)
Unbudgeted permit delays
Unbudgeted scope growth (addenda+discovery)
Labor logistical inefficiency
Regional Economics, Supervision & Crafts
Equipment transition efficiency
Weather delays
Housekeeping delays
Unbudgeted contingency (i.e., Field Change Orders)
Of course, other or additional risk-determinative conditions may exist or be included in a given turnaround or construction project, but the foregoing risk-determinative conditions come into play in the vast majority of industrial turnaround or construction projects.

For each risk-determinative condition, any inefficiency factor ascribed to the condition in a current estimate (planned) to be analyzed is input to the software of the system through a user interface. For each risk determinative condition, a series of questions (also referred to herein as "potential inefficiency contributors") are posed in order to develop historical (planned) inefficiency factor for validated historical projections with respect to each risk determinative condition. The current estimate (planned) data are obtained from the current plan under analysis; namely, the current plan's estimated cost data, man-hour data and duration data. The potential inefficiency contributors are identified, and the historical project inefficiency factors calculated, according to industry norms regarding the sources of manpower inefficiency which exist for typical industrial turnaround or construction projects.

As used in this disclosure, project tasks are steps or subcomponents within the entire project of varying complexity and duration which must be carried out in order to complete the turnaround and/or project. Although not required, the entire project typically will comprise a plurality of tasks, and some risk conditions may or may not apply to all of the tasks within a given project.

Reference should be made to the figures and the following description of one embodiment of the invention, for a complete understanding of the process carried out in one particular, illustrative embodiment of the invention:

Phase I

Typically, a turnaround or construction project owner will develop an estimate (also referred to herein as "current" or "planned" estimate) which should typically include, e.g., total cost, total man-hours, duration, pre-execution man-hours (which are a part of total man-hours), post-execution man-hours (which are a part of total man-hours), contingencies (also known as addenda work scope growth, discovery work scope growth and/or field change orders; which can be a part of cost and/or man-hours), and an inefficiency factor (also referred to herein as an "inefficiency multiple"). In one aspect of this invention, from an input of the estimate (planned) data is calculated a projected cost risk, using a composite cost rate per man-hour applicable to the project ("Composite Cost Rate"), as well as the current estimated (planned) inefficiency factor (converted into man-hours), and a projected inefficiency factor developed pursuant to this invention, each factor being allocated in accordance with this invention to each of a plurality of risk-determinative conditions which are not accounted for, or may be inaccurately accounted for, in the estimate (planned). The calculation of the Composite Cost Rate can be expressed mathematically in the following algorithm:

$$\text{Total Cost (\$)} \pm \text{Total Man-hours(inclusive of contingencies)} = \text{Composite Cost Rate}$$

The inefficiency factor provided as part of the initial estimate (planned) is analyzed (through question and answer sessions with a plurality of personnel involved in the execution of the proposed project) to determine whether and, if so, how that initial inefficiency factor was allocated across the risk-determinative conditions when preparing the initial estimate (planned). Those allocations are the subject of scrutiny through validation and additional inputs are provided where necessary to accurately assess the risk-determinative condition and to produce a projected inefficiency factor for each risk-determinative condition.

The aforesaid validation is conducted by making, where necessary, quantitative adjustments, which are those numeric adjustments to current estimated or historical estimated man-hours, current estimated or historical estimated cost and/or current estimated or historical estimated duration for a given risk-determinative condition in a given project task within a project or turnaround estimate under analysis, using the system or method of this invention. The quantitative adjustments account for anomalous historical risk which is no longer anticipated with respect to the historical estimated potential inefficiency contributor data and account for newly known risk which is anticipated with respect to the current estimated data, or both. Historical estimated potential inefficiency contributor data (historical estimated cost data, historical estimated man-hour data and historical estimated duration data) is cost-, man-hour- and/or duration-related estimation data regarding potential inefficiency contributors relevant to the risk-determinative conditions and/or projects in total, realized on past projects executed by the project owner. Validated current estimated data and validated historical estimated potential inefficiency contributor data (the latter also referred to herein as "projected" data) are current estimated (planned) data and historical estimated potential inefficiency contributor data, respectively, net of quantitative adjustments determined to be necessary.

The projected or historical estimated inefficiency factor allocation for each of the risk-determinative conditions, thus calculated, is compared to the initial estimate's (planned) inefficiency factor allocation, respectively. The difference (differential) between the planned and projected inefficiency factor allocation for each risk-determinative condition is multiplied by a number which is equal to the total execution man-hours minus the previously identified inefficiencies (expressed in man-hours) for that risk-determinative condition, thus yielding man-hours attributed to inefficiencies caused by the risk-determinative condition which were not included in the initial estimate (planned). This calculation can be completed by executing software coded to employ the following algorithm:

$$\text{(Total (Planned) Execution Man-hours} - \text{Current Estimated (Planned) Inefficiency Man-hours)} \times \text{Inefficiency Factor Differential} \times \text{Composite Cost Rate} = \text{Initial Risk (\$) (IR)}$$

The Initial Risk (IR) for each of the risk-determinative conditions may be summed to yield Total Initial Risk for the project.

Phase II

The initial risk for each of the risk-determinative conditions is then converted to quantified risk, by evaluating systematically the probability of the respective risk-determinative condition's occurrence. Probability of occurrence (PO) is the probability (having a value between 0 and 1, inclusive) that the initial risk for each risk-determinative condition is realized. This probability of occurrence is assigned through a group collaboration of a plurality of personnel experienced in project execution, preferably by consensus.

Quantified risk (QR) so determined can be calculated again by executing software coded to employ the following algorithmic expression:

$$QR=IR \times PO$$

also typically expressed in terms of currency, such as dollars.

The quantified risk (or QR) for each risk-determinative condition is then converted to final risk (or FR) by identifying potential mitigation of the occurrence of the risk-determinative condition, expressed as a probability of mitigation success (PMS). PMS is the probability (having a value between 0 and 1, inclusive) assigned to mitigating the quantified risk (or QR) for each risk-determinative condition. This probability is assigned through a group collaboration of a plurality of personnel experienced in project execution, preferably by consensus. Cost of mitigation (or CM) may be factored into determining the probability of mitigation success (PMS), or it may be treated separately, as noted below.

Final Risk (FR) can be mathematically expressed in the following algorithm:

$$FR=(IR \times PO) \times PMS[optionally+CM]$$

or $$FR=QR \times PMS[optionally+CM]$$

with PMS again expressed in terms of currency, such as dollars. If cost of mitigation of risk was not factored into determining the probability of mitigation success initially, then the cost of mitigation may be added to the product of quantified risk multiplied by probability of mitigation success, to arrive at an accurate Final Risk (FR) total. Final Risk (FR) for all risk-determinative conditions can then be summed to arrive at final cost risk value output at the project level, or any selected portion (e.g., task or task category) thereof.

Once final risk values are calculated for each risk-determinative condition of each project task, adjusted estimated costs, adjusted estimated man-hours and adjusted estimated duration for each of the project tasks may be further calculated by summing the current estimated costs, current estimated duration and current estimated man-hours for each project task with the final risk values calculated for all of the risk-determinative conditions for the respective project task, and generating for display an output of the adjusted estimated costs, adjusted estimated man-hours and adjusted duration for each of the project tasks, for the project as a whole, or for both.

Phase III

In order to take full advantage of the power of the decision-making information provided by systems of the invention, in some aspects of the invention the process carried out using the system will further entail gathering information about the actual execution outcomes for a given project for which pre-execution estimation risk analysis was conducted, in order to assess the accuracy of the initial analysis and to feedback the realized results into the system, in order to utilize the actual performance data in establishing margins of error in the predicted risk and to enhance the accuracy of projected inefficiencies and projected risk in future estimate analyses. The accuracy of the system and method is further enhanced from repeated actual performance data feedback into, and storage and use of such data in, the system over time. It also enables trending and benchmarking analyses of projects in multiple datasets across or within industries, or project-specific criteria such as, e.g., owner identity, manager identity, geographical location, size, type, financial magnitude, man-hour magnitude, etc. Thus, the software of the system may be further programmed so that the process carried out further comprises:

receiving from one or more of the user interfaces, and storing in one or more of the data stores, realized potential inefficiency contributor data (which typically will be collected, e.g., by monitoring a project task in execution) expressed initially as, or convertible into, one or more of realized cost data, realized man-hour data and realized duration data, attributable to each of the plurality of risk-determinative conditions for the one or more project tasks;

calculating, by means of one or more of the processors, the difference between the validated current estimated potential inefficiency contributor data and the realized potential inefficiency contributor data for each of the risk-determinative conditions for each of the project tasks, to yield a realized actual inefficiency value (in monetary terms) for each of the risk-determinative conditions for each of the project tasks; and calculating, by means of one or more of the processors, a realized risk for each of the risk-determinative conditions for each of the project tasks by subtracting the realized actual inefficiency value from the final risk previously calculated respectively for each of the risk-determinative conditions for each of the project tasks.

The sum of the realized risks (in monetary terms) for the risk determinative conditions of the project tasks should equal the realized risk (in monetary terms) on the project. If the realized risk in monetary terms is greater than zero, then the system will reflect that the previously calculated final risk (before the project was executed) did not account for all risk in advance. The realized actual inefficiency values and the realized risk values for each of the risk-determinative conditions, will enable a user to understand the conditions which gave risk to the realized risk, so that such risk determinative conditions may be further studied for risk mitigation opportunities on future projects. In addition, the realized potential inefficiency contributor data can be taken into account on future projects, when such data is used as the "historical" estimated potential inefficiency contributor data. Thus, in some aspects of the invention, the process carried out by the system further comprises:

employing the stored, realized potential inefficiency contributor data of the project tasks as historical estimated potential inefficiency contributor data and repeating the foregoing steps with respect to current estimated data specific to another set of one or more project tasks of a different project, so as to calculate, by means of one or more of the processors, initial risk values for the one or more risk-determinative conditions of the one or more project tasks of the different project.

Over time, collections of projects' data may enable realized data values to be averaged or trended for further use in the analyses. In this way, the system "learns" from the experience of realized project outcomes, and uses the data born from experience to improve accuracy of the results of Phases I & II of the system's evaluation of future project estimates, by automatically adjusting embedded parameters (historical estimated potential inefficiency contributor data) with more results actually achieved on previously analyzed projects and stored within the system's data stores.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more data stores, normally in the form of memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable tangible media upon which is encoded machine-readable software in accordance with this disclosure should be suitable for storing computer program instructions and data, which may be same as or different from the data store. Suitable examples of such media (and data store) include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a user interface, such as, e.g., a keyboard and a pointing device, e.g., a touchscreen, mouse or trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The following Example further illustrates the data input and calculations undertaken in a particular embodiment of the invention for a hypothetical project. It should be appreciated that this example is merely to illustrate the calculations undertaken by the system and method of one embodiment of the invention, and is not intended to limit the scope of the invention in any way.

EXAMPLE

FIG. 1 shows a flow diagram of the steps carried out by the system and method according to one embodiment of the invention. FIGS. 2-19 illustrate the computer displays which are generated from the inputs and outputs of the computerized system in a computerized analysis of a hypothetical turnaround project for a refinery. As noted in the flow diagram of FIG. 1, data from the owner's initial project plan (current estimated man-hours, cost and duration) for the overall project are obtained and input into the system, for display as shown in FIG. 2. A composite man-hour rate (cost per man-hour) may be determined from this data, and is displayed in FIG. 2 as $150. Current estimated data and historical estimated data are examined for inefficiencies created by several risk-determinative conditions such as, for example, labor logistical inefficiencies. To do so, data in the form of answers to a series of questions regarding potential inefficiency contributors ("potential inefficiency contributors")(e.g., activity duration) and values used to calculate such potential inefficiency contributors, such as shift duration, number and duration of breaks/lunch and number and duration of safety meetings, are entered into the model and made available for display, as illustrated in FIGS. 3-14. A historical estimated (projected) inefficiency factor for the risk-determinative condition is calculated from the inputted potential inefficiency contributors, in this case 0.2083 for labor logistical inefficiencies, as seen on FIG. 3. The executing software calculates the differential between the calculated projected inefficiency factor (0.2083) and the current estimated inefficiency factor (0.1000) used in the current estimate and allocated to this particular risk determinative condition. That differential (rounded to 0.108 in FIG. 3) is then multiplied by the Bare Turnaround (TA) Execution Man-hours (Total Forecasted TA Execution Man-hours minus Inefficiency Man-hours Included in Baseline Man-hours in the display of FIG. 2.) thereby yielding Labor Logistical Inefficiency Man-hours of 13,481, as noted in the display of FIG. 3. The Labor Logistical Inefficiency Man-hours are then multiplied by the Composite Rate from FIG. 2 to yield Initial Cost Risk of $2,022,222 for the Labor Logistical Inefficiency Category as listed in FIGS. 16 and 17. The Initial Risk for Labor Logistical Inefficiency listed in FIG. 16 is then examined by group collaboration of a plurality of personnel experienced in like projects, to determine and assign (preferably by consensus) a Probability of Occurrence (0.70 or 70% as noted in the display of FIG. 16). The product of that probability multiplied by $2,022,222 yields the Quantified Risk ($1,415,556) as displayed in FIGS. 16 and 18. Group collaboration of the same personnel is also used to determine probability of mitigation success (gauging the probability of successfully mitigating the risk), and to estimate mitigation cost (estimated at 0 in this example, as seen from FIG. 16). Upon entry of the probability of mitigation success into the software, the system further multiplies that probability (in this case 0.3 or 30% as shown in FIG. 16) by the Quantified Risk, yielding a calculated Final Risk of $990,889, as seen from the displays of FIGS. 16 and 19.

Figure 17:
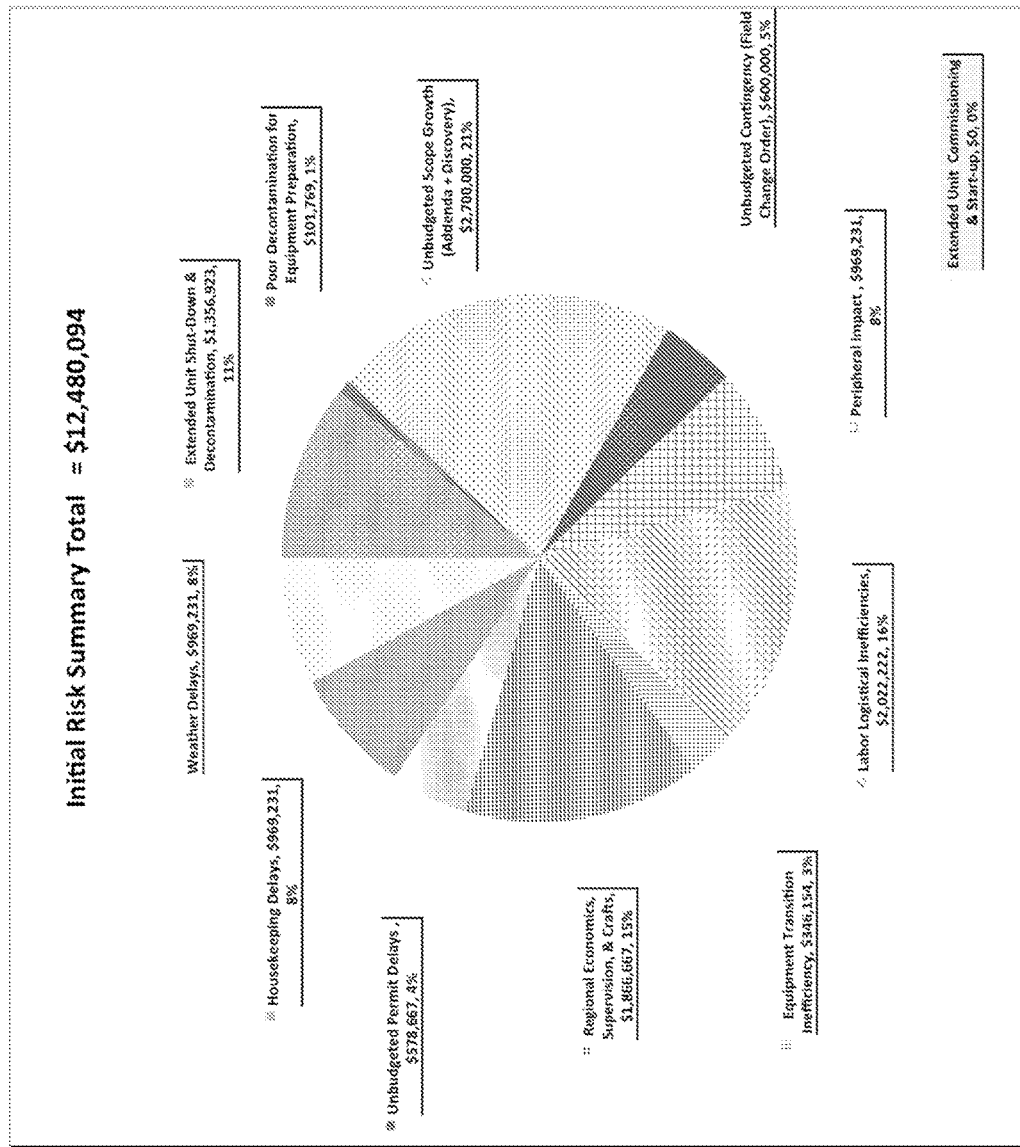
FIG. 17 is an output display produced by the system of FIG. 1, illustrating a pie chart representation of the initial risk values for the risk-determinative conditions output in the display of FIG. 5.
Figure 18:
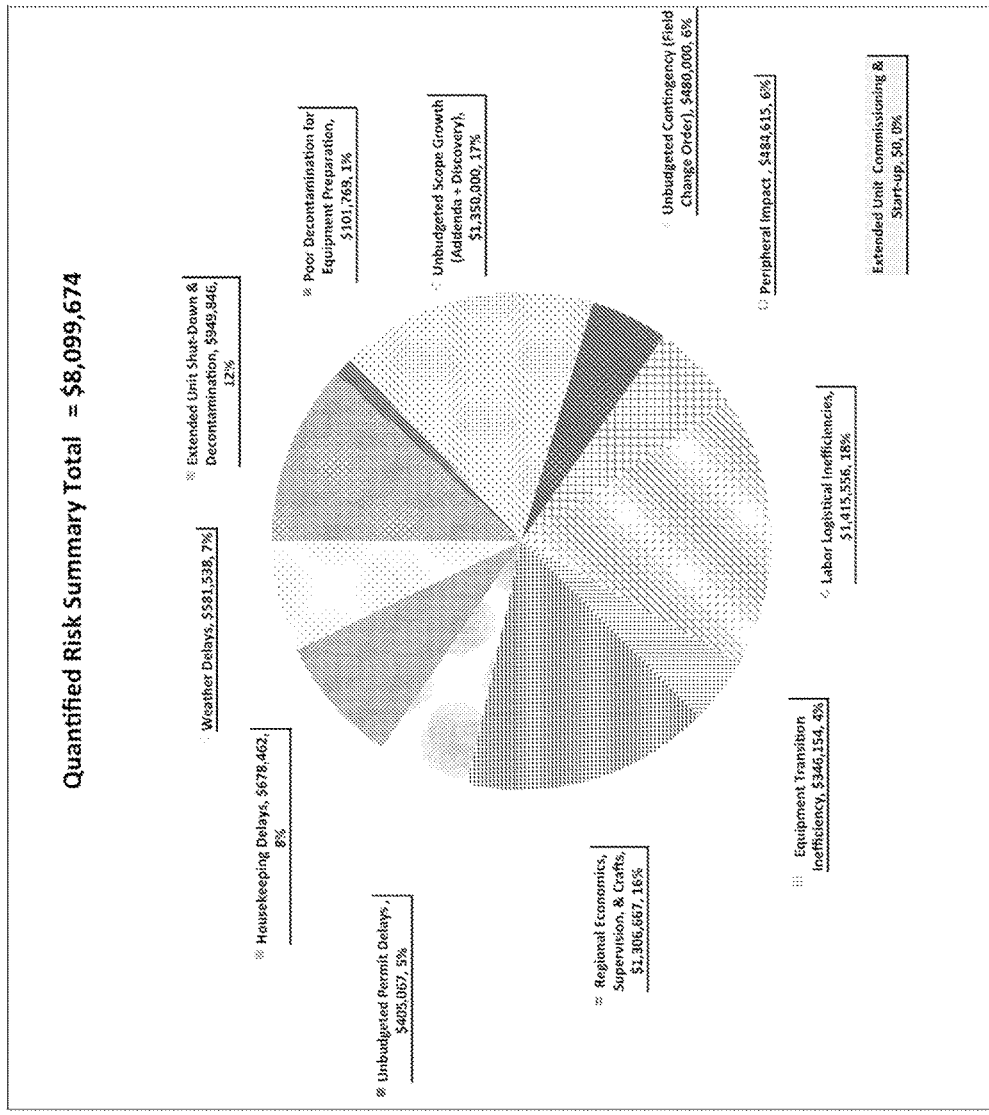
FIG. 18 is an output display produced by the system of FIG. 1, illustrating a pie chart representation of the quantified risk values for the risk-determinative conditions output in the display of FIG. 5.
Figure 19:
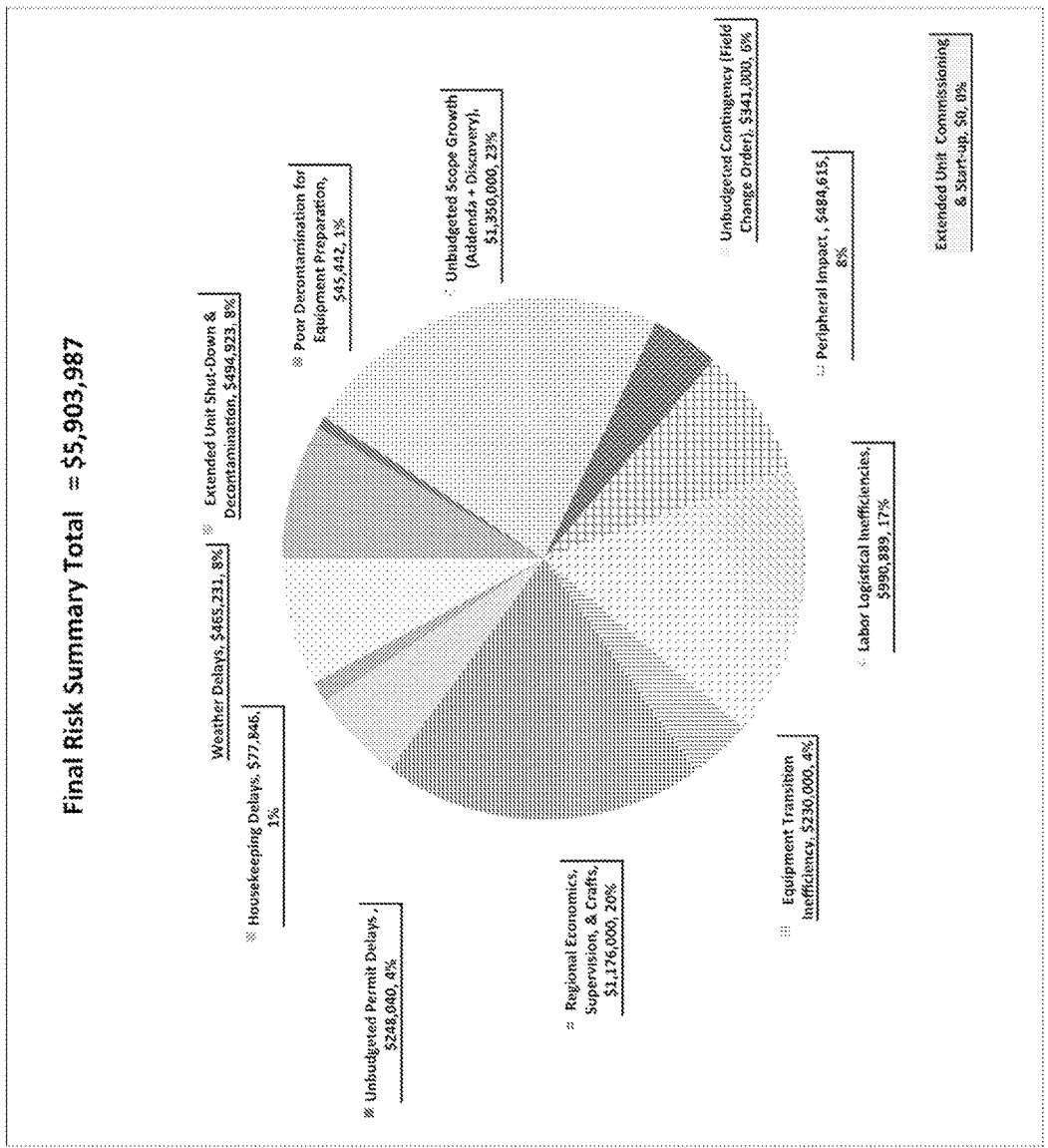
FIG. 19 is an output display produced by the system of FIG. 1, illustrating a pie chart representation of the final risk values for the risk-determinative conditions output in the display of FIG. 5.

This process is likewise conducted for each of the other risk-determinative conditions (listed out at FIGS. 4-14), using values input for the potential inefficiency contributors relevant to each risk-determinative condition. As seen from FIG. 16, the initial, quantified and final risks may be totaled for the project as a whole and/or displayed in itemized fashion. FIGS. 17, 18 and 19 illustrate how the various levels of cost risk, initial, quantified and final, respectively, created by each risk-determinative condition and displayed at FIG. 16, may be compared visually, for example by means of a pie chart. As displayed in FIG. 2, data relevant to this Example could further provide adjusted current estimated cost for the project as a whole, by summing the initial total cost of the project ($36,000,000 from FIG. 2) with the final risk value ($5,903,987 from FIG. 16 as shown in FIG. 2) ascribed to all of the risk-determinative conditions, for a total adjusted current cost estimate of $41,903,987, as show in FIG. 2.

Figure 20:
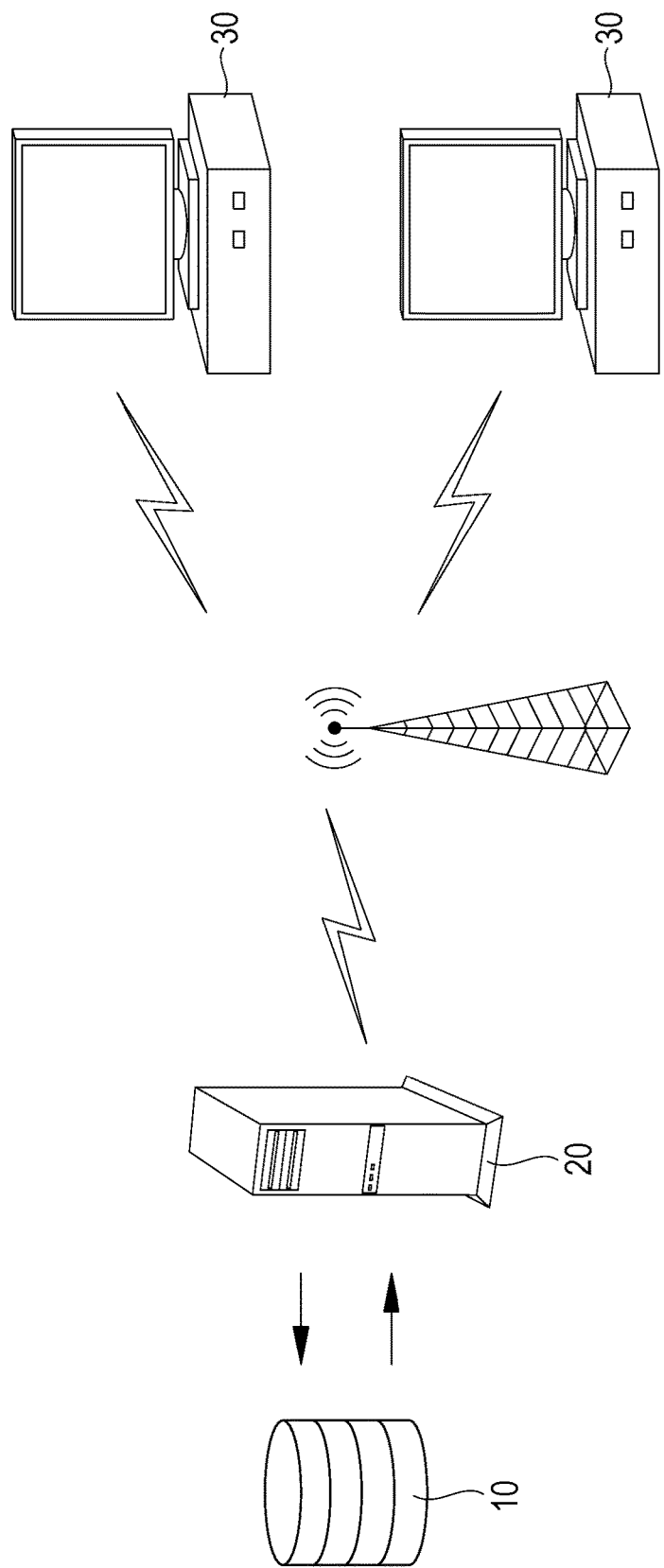
FIG. 20 is a schematic diagram showing the system of FIG. 1 implemented upon server in operative communication with one or more data stores, and accessible by multiple user interfaces over a communications network, e.g., the Internet.

As illustrated at FIG. 20, in one aspect of the invention, the system is deployed as a programmed computer server 20 equipped with one or a plurality of processors in operative communication with one or more data stores 10. Server 20 receives and processes input from and sends output to one or a plurality of displays of one or a plurality of remote user interfaces in the form of computers 30 via a telecommunications network, e.g., the Internet. In the illustrated system, the interfaces of computers 30 will typically display the output of a browser or a similar software application to facilitate a user's interface with the system, including the input of data to the system via a touch screen, keyboard, mouse or the like and the display of outputs sent to the interfaces by server 20, using conventional computer network transmission protocols and wired or wireless network components. In this aspect, the system enables the provision of online services to multiple users and customers at locations remote from centrally-managed processors and data stores. Aggregation of data collected in the data stores across project tasks, projects and groups or sources of projects over time enable users of the system to query and mine the data stores for trends and perform other statistical analysis and to level the historical data archive to decrease final risk values and realized risk on future project manpower estimates.

While this specification contains many specific implementation details and may describe particular embodiments of the subject matter in great detail, these should not be construed as limitations on the scope of any invention or of what may be claimed, but rather as descriptions of features that may be specific to particular embodiments of particular inventions. Other embodiments are within the scope of the following claims. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the processes depicted in the accompanying figures do not necessarily require the particular order shown, or sequential order, to achieve desirable results. In certain circumstances, multitasking and parallel processing may be advantageous. Moreover, the separation of various system components in the embodiments described above should not be understood as requiring such separation in all embodiments, and it should be understood that the described program components and systems generally can be integrated together in a single software product or packaged into multiple software products.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise. In addition, the invention may comprise, consist, or consist essentially of the materials, components and/or steps recited herein.

The invention claimed is:

1. Computer apparatus for analyzing industrial turnaround or construction project execution estimates, the apparatus comprising one or more data stores, one or more processors in operative communication with the data stores, and one or more tangible computer-readable media upon which is encoded machine-readable software which, upon its execution, is configured so that the system carries out a process comprising:

receiving from one or more user interfaces, and storing in one or more of the data stores, current estimated data expressed initially as, or convertible into, and one or more of current estimated cost data, current estimated man-hour data and current estimated duration data, attributable a plurality of risk-determinative conditions for one or more project tasks;

receiving from one or more of the user interfaces, and storing in one or more of the data stores, historical estimated potential inefficiency contributor data expressed initially as, or convertible into, one or more of historical estimated cost data, historical estimated man-hour data and historical estimated duration data, attributable to each of the risk-determinative conditions for the project tasks;

receiving from one or more of the user interfaces, and storing in one or more of the data stores, one or more quantitative adjustments to the current estimated data and the historical estimated potential inefficiency contributor data, which quantitative adjustments at least in part account for either anomalous historical risk which is no longer anticipated with respect to the historical estimated potential inefficiency contributor data, or newly known risk which is anticipated with respect to the current estimated data, or both, and by means of the processors summing the quantitative adjustments, if any, respectively with the current estimated data and the historical estimated potential inefficiency contributor data attributable to each of the risk-determinative conditions for the project tasks, to yield validated current estimated data and validated historical estimated potential inefficiency contributor data attributable to each of the risk-determinative conditions for the project tasks;

calculating by means of one or more of the processors a difference between a current estimated inefficiency factor applied to the validated current estimated data and a projected inefficiency factor applied to the validated historical estimated potential inefficiency contributor data for each of the risk-determinative conditions for each of the project tasks, to yield an initial risk value for each of the risk-determinative conditions for each of the project tasks;

receiving from one or more of the user interfaces, and storing in one or more of the data stores, a probability of occurrence for each of the risk-determinative conditions and calculating a quantified value of risk for each of the risk-determinative conditions by multiplying each of the initial risk values by the respective probability of occurrence;

receiving from one or more of the user interfaces, and storing in one or more of the data stores, a probability of mitigation success for each of the risk-determinative conditions and any cost of mitigation to be undertaken;

calculating by means of one or more of the processors a final risk value for each of the risk-determinative conditions, by multiplying each probability of mitigation success by the respective quantified value of risk for each of the risk-determinative conditions, and summing the resulting product with the cost of mitigation to be undertaken; and generating by means of one or more of the processors a final risk value output configured to enable a representation of the final risk value for each of the risk-determinative conditions to be electronically displayed.

2. The computer system of claim 1, wherein the software is further configured so that the system carries out a process further comprising:

calculating by means of one or more of the processors adjusted estimated costs, adjusted estimated man-hours and adjusted estimated duration for each of the project tasks, by summing the current estimated costs, current estimated duration and current estimated man-hours for each of the project tasks, with the sum of all of the final risk values for the risk-determinative conditions for each of the project tasks respectively; and generating by means of one or more of the processors an adjusted estimates output configured to enable a representation of the adjusted estimated costs, adjusted estimated man-hours and adjusted estimated duration for each of the project tasks respectively, for the project as a whole, or for both, to be electronically displayed.

3. The computer apparatus of claim 2, further comprising a display configured to receive the final risk value output, the adjusted estimates output, or both, and to display their respective representation(s).

4. The computer apparatus according to any of claims 1-3, wherein the quantitative adjustments to the current estimated data and the historical estimated potential inefficiency contributor data, are prepared by conducting one or more collaborative interviews with a first plurality of personnel experienced in comparable project execution, and wherein the probability of occurrence for each of the risk-determinative conditions and the probability of mitigation success for each for each of the risk-determinative conditions are each determined by collaborative consensus amongst a second plurality of personnel experienced in comparable project execution.

5. The computer apparatus according to claim 4, wherein the process carried out by the system further comprises:

receiving from one or more of the user interfaces, and storing in one or more of the data stores, realized potential inefficiency contributor data expressed initially as, or convertible into, one or more of realized cost data, realized man-hour data and realized duration data, attributable to each of the plurality of risk-determinative conditions for the one or more project tasks;

calculating, by means of one or more of the processors, the difference between the validated current estimated potential inefficiency contributor data and the realized potential inefficiency contributor data for each of the risk-determinative conditions for each of the project tasks, to yield a realized actual inefficiency value for each of the risk-determinative conditions for each of the project tasks; and calculating, by means of one or more of the processors, a realized risk for each of the risk-determinative conditions for each of the project tasks by subtracting the realized actual inefficiency value from the final risk previously calculated respectively for each of the risk-determinative conditions for each of the project tasks.

6. The computer apparatus according to claim 5, wherein the process carried out by the system further comprises:

employing the stored, realized potential inefficiency contributor data of the project tasks as historical estimated potential inefficiency contributor data and repeating the foregoing steps with respect to current estimated data specific to another set of one or more project tasks of a different project, so as to calculate, by means of one or more of the processors, initial risk values for the one or more risk-determinative conditions of the one or more project tasks of the different project.

7. The computer apparatus according to any of claims 1-3, wherein the process carried out by the system further comprises:

receiving from one or more of the user interfaces, and storing in one or more of the data stores, realized potential inefficiency contributor data expressed initially as, or convertible into, one or more of realized cost data, realized man-hour data and realized duration data, attributable to each of the plurality of risk-determinative conditions for the one or more project tasks;

calculating, by means of one or more of the processors, the difference between the validated historical estimated potential inefficiency contributor data and the realized potential inefficiency contributor data for each of the risk-determinative conditions for each of the project tasks, to yield a realized actual inefficiency value for each of the risk-determinative conditions for each of the project tasks; and calculating, by means of one or more of the processors, a realized risk for each of the risk-determinative conditions for each of the project tasks by subtracting the realized actual inefficiency value from the final risk previously calculated respectively for each of the risk-determinative conditions for each of the project tasks.

8. The computer apparatus according to claim 7, wherein the process carried out by the system further comprises:

employing the stored, realized potential inefficiency contributor data of the project tasks as historical estimated potential inefficiency contributor data and repeating the foregoing steps with respect to current estimated data specific to another set of one or more project tasks of a different project, so as to calculate, by means of one or more of the processors, initial risk values for the one or more risk-determinative conditions of the one or more project tasks of the different project.

9. A computerized method of preparing an industrial turnaround or construction project execution estimate analysis, the method comprising:

receiving from one or more computer interfaces, and storing in one or more data stores, current estimated data expressed initially as, or convertible into, one or more of current estimated cost data, current estimated man-hour data and current estimated duration data, attributable to a plurality of risk-determinative conditions for one or more project tasks;

receiving from one or more of the computer interfaces, and storing in one or more of the data stores, historical estimated potential inefficiency contributor data expressed initially as, or convertible into, one or more of historical estimated cost data, historical estimated man-hour data and historical estimated duration data, attributable to the risk-determinative conditions for the project tasks;

conducting one or more collaborative interviews with a first plurality of personnel experienced in comparable project execution, so as to develop one or more quantitative adjustments to the current estimated data and the historical estimated potential inefficiency contributor data, which quantitative adjustments at least in part account for either anomalous historical risk which is no longer anticipated with respect to the historical estimated potential inefficiency contributor data, or new known risk which is anticipated with respect to the current estimated data, or both;

receiving from one or more of the computer interfaces, and storing in the data stores, the one or more quantitative adjustments to the current estimated data and the historical estimated potential inefficiency contributor data attributable to the risk-determinative conditions for the project tasks, and summing, by means of one or more processors in operative communication with the data stores, the quantitative adjustments, if any, respectively with the current estimated data and the historical estimated potential inefficiency contributor data attributable to each of the risk-determinative conditions for the project tasks, to yield validated current estimated data and validated historical estimated potential inefficiency contributor data attributable to each of the risk-determinative conditions for each of the project tasks;

calculating by means of one or more of the processors a difference between a current estimated inefficiency factor applied to the validated current estimated data and a projected inefficiency factor applied to the validated historical estimated potential inefficiency contributor data for each of the risk-determinative conditions for each of the project tasks, to yield an initial risk value for each of the risk-determinative conditions for each of the project tasks;

conducting one or more collaborations with a second plurality of personnel experienced in comparable project execution, in order to establish by consensus a probability of occurrence for each of the risk-determinative conditions and a probability of mitigation success for each of the risk-determinative conditions;

receiving from one or more of the computer interfaces, and storing in one or more of the data stores, the probability of occurrence for each of the risk-determinative conditions and calculating, by means of one or more of the processors, a quantified value of risk for each of the risk-determinative conditions by multiplying each of the initial risk values by the respective probability of occurrence;

receiving from one or more of the computer interfaces, and storing in one or more of the data stores, the probability of mitigation success for each of the risk-determinative conditions;

computing, by means of one or more of the processors, a final risk value for each of the risk-determinative conditions, by multiplying each probability of mitigation success by the respective quantified value of risk for each of the risk-determinative conditions, and summing the resulting product with any cost of mitigation to be undertaken; and generating, by means of one or more of the processors, a final risk value output configured to enable a representation of the final risk value for each of the risk-determinative conditions to be electronically displayed.

10. The computerized method of claim 9, further comprising:

calculating by means of one or more of the processors, adjusted estimated costs, adjusted estimated man-hours and adjusted estimated duration for each of the project tasks, by summing the current estimated costs, current estimated duration and current estimated man-hours for each project task with the final risk values calculated for all of the plurality of risk-determinative conditions for the respective project task, and generating for display on an electronic display an output of the adjusted estimated costs, adjusted estimated man-hours and adjusted duration for each of the project tasks, for the project as a whole, or for both.

11. The computerized method of claim 10, further comprising displaying on the electronic display the output of the adjusted estimated costs, man-hours and duration for each of the project tasks.

12. The computerized method of claim 9, further comprising:

receiving from one or more of the user interfaces, and storing in one or more of the data stores, realized potential inefficiency contributor data expressed initially as, or convertible into, one or more of realized cost data, realized man-hour data and realized duration data, attributable to each of the plurality of risk-determinative conditions for the one or more project tasks;

calculating, by means of one or more of the processors, the difference between the validated historical estimated potential inefficiency contributor data and the realized potential inefficiency contributor data for each of the risk-determinative conditions for each of the project tasks, to yield a realized actual inefficiency value for each of the risk-determinative conditions for each of the project tasks; and calculating, by means of the processors, a realized risk for each of the risk-determinative conditions for each of the project tasks by subtracting the realized actual inefficiency value from the final risk previously calculated respectively for each of the risk-determinative conditions for each of the project tasks.

13. The computerized method of claim 12, further comprising employing the stored, realized potential inefficiency contributor data of the project tasks as historical estimated potential inefficiency contributor data and repeating the foregoing steps with respect to current estimated data specific to another set of one or more project tasks of a different project, so as to calculate, by means of one or more of the processors, initial risk values for the one or more risk-determinative conditions of the one or more project tasks of the different project.

* * * * *